W. F. Cochrane,
Mill Bolt.
No. 60,860.        Patented Jan. 1, 1867.
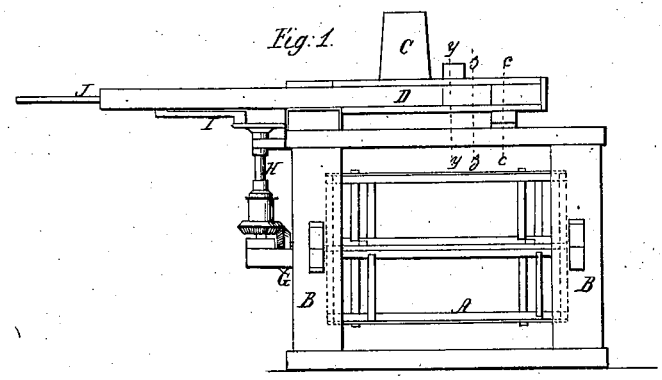
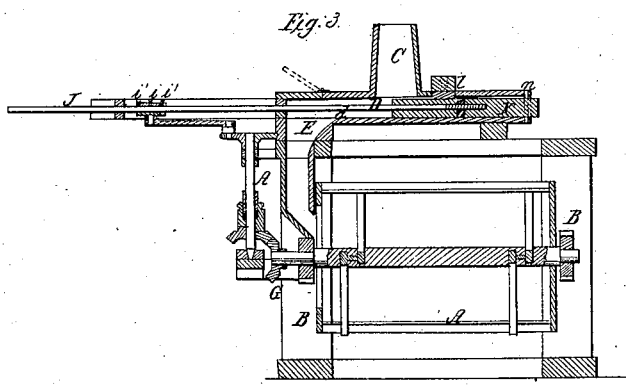
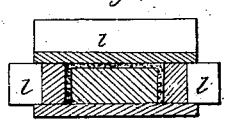
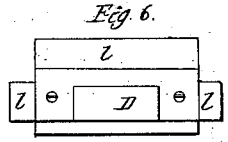
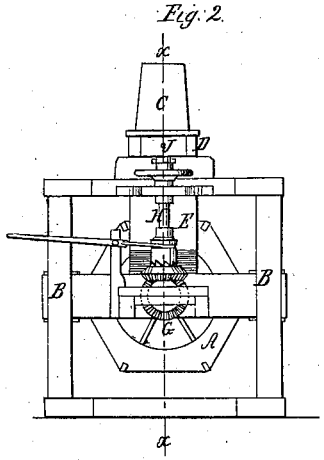
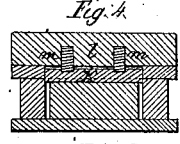
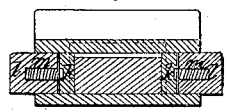
Witnesses;
J. J. Peyton
Theodore Lang
Inventor,
Wm. F. Cochrane
by his Atty
B. Darwin

United States Patent Office.

WILLIAM F. COCHRANE, OF SPRINGFIELD, OHIO.

Letters Patent No. 60,860, dated January 1, 1867.

---

IMPROVEMENT IN FLOUR-BOLTS.

---

The Schedule referred to in these Letters Patent and making part of the same.

---

TO ALL WHOM IT MAY CONCERN:

Be it known that I, WILLIAM F. COCHRANE, of Springfield, in the county of Clark, and State of Ohio, have invented a new and useful method of Feeding Meal to the Bolting-Reels of Flouring-Mills; of which the following is a full, clear, and exact description, reference being had to the accompanying drawings, which make part of this specification, and in which—

Figure 1 represents a side view of a bolting-reel, to which my improvement is applied.

Figure 2 represents an end view of the same.

Figure 3 represents a vertical longitudinal section through the same, at the line $x\ x$ of fig. 2.

Figure 4 is a section at the line $y\ y$ of fig. 1.

Figure 5 is a similar section at the line $z\ z$ of fig. 1.

Figure 6 is an end view of the pump barrel; and

Figure 7, a section through the same at the line $o\ o$ of fig. 1.

In flouring-mills, as generally constructed, the meal is fed to the bolting-reels by gravity alone; when so fed the feed is irregular, as the meal packs, at times, and suspends the feed, and again descends in quantities too great for the reel to bolt at once.

In a former patent I have endeavored to obviate this difficulty, in a bolt in which a blast was employed to force the flour through the meshes of the bolt by the use of a pump, but that invention could not, I found, be successfully applied to all flour-bolts.

It is the object of my invention to feed flour or meal into a bolting-reel, at regular intervals, and in uniform quantities.

In the accompanying drawings, which exemplify one convenient mode of carrying out the objects of my invention, a bolting-reel, A, of proper construction, is shown as supported in a stout frame, B. A feed-spout, C, leads from the cooling chamber or hopper-boy directly to the barrel D of the feed pump, which is arranged horizontally above the bolting-reel. A spout, E, leads from one end of the pump barrel into one end of the bolting-reel. The reel is rotated in any suitable manner. A bevel-wheel, G, on one end of its shaft, carries a corresponding pinion on a vertical shaft, H, to which a pitman, I, is attached. This pitman vibrates the pump-rod J, which slides longitudinally, in proper bearings, in the frame. The piston-rod slides through a collar, $i$, attached to the pitman, and can be held in any desired position by collars, $i'$, provided with set-screws to clamp the collars on the rod, which is by this means left free to be moved longitudinally or axially, to regulate the stroke of the pump, and yet can be fixed when desired. The piston K slides in its barrel D, which it fits snugly. The piston-rod J screws into it, so as to vary the position relatively to the feed-spout. It is essential to the proper working of the pump that the piston should work air-tight in the barrel. Wood is the best, the cheapest, and the most generally employed material, but it is liable to shrink and work loose, and thus permit the escape of air. To obviate this defect, I surround the piston K, on three sides, with packing-blocks, $k$, sliding in boxes, $l$, and pressed upon the piston by springs, $m$, thus at all times maintaining their respective surfaces in contact with the piston, and compensating for any wear or shrinkage of the parts. To render the packing still more perfect, I pack wool around the head of the piston farthest from the flour, and also insert a washer, $n$, of leather between the head of the barrel and its cover, which is held on by screws which can be screwed up as occasion requires. The reel-spout E is closed at top by a lid or valve, E', which can be opened when it is desired to ventilate the reel by allowing cool air to enter it, (see fig. 3.)

In operation; the meal passes from the hopper-boy or cooling chamber through the spout C, into the barrel D of the pump, where the forward stroke of the piston K pushes it towards the reel-spout E. Part of the meal thus shoved forward passes through the spout into the bolting-reel A, while a part remains packed in the barrel, at $d$, thus closing that end. On the back stroke of the piston a partial vacuum is created by the withdrawal of the piston, as the barrel is packed by the meal, as above explained, and the only other entrance is through the feed-spout C; the pressure of the atmosphere is therefore exerted upon the meal in the spout, and aids the gravity in feeding the flour to the extent of the vacuum thus created. This I have found a great assistance in preventing the packing of the meal. At each stroke of the piston the preceding charge is displaced, and the last one takes its place. By screwing the rod J into the piston, the latter can be made to advance a quarter or less distance towards the reel spout, on its forward stroke, and thus increase or diminish the area of the mouth of the feed-spout, which correspondingly regulates the amount of meal fed to the reel.

By the above description it will be seen that a regulated and uniform quantity of meal is at regular intervals injected into the reel by a positive motion. This mode of feeding I deem of the greatest utility, as I have found in practice that the same set of reels will bolt much more meal in a given time, when fed by my pump, than when fed by the old process, and produce flour of more uniform grade. The pump is driven from the reel-shaft, and is thrown into or out of gear by a sliding clutch on the crank-shaft, or in some other well known way. By these means I can stop or start the pump while the reel is working without affecting its movement. When the lid E' is closed the meal is pumped through the reel with the air, which descends with it; but when the lid is closed the air passes up through the reel and escapes at the top of the spout, its place being supplied by cool air from below.

What I claim as my invention, and desire to secure by Letters Patent, is—

1. The combination, with the reel, reel-spout, and pump, of the ventilating valve E', as and for the purpose described.

2. The arrangement of the feed-spout, pump barrel, packed piston, and reel-spout, with relation to each other and to the reel, as and for the purpose described.

3. The combination, with the feed-spout and pump barrel, of a flour pump, of the piston packing-blocks, spring boxes, and woollen packing, as and for the purpose described.

In testimony whereof I have hereunto subscribed my name.

W. F. COCHRANE.

Witnesses:
    EDM. F. BROWN,
    J. I. PEYTON.